(12) United States Patent
Zehler

(10) Patent No.: US 10,271,206 B2
(45) Date of Patent: Apr. 23, 2019

(54) METHODS AND SYSTEMS FOR SECURELY ROUTING DOCUMENTS THROUGH THIRD PARTY INFRASTRUCTURES

(71) Applicant: Xerox Corporation, Norwalk, CT (US)

(72) Inventor: Peter J. Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 226 days.

(21) Appl. No.: 15/266,189

(22) Filed: Sep. 15, 2016

(65) Prior Publication Data

US 2018/0077567 A1 Mar. 15, 2018

(51) Int. Cl.
*H04L 29/06* (2006.01)
*H04W 12/02* (2009.01)
*G06F 21/60* (2013.01)
*H04W 12/04* (2009.01)
*H04L 9/08* (2006.01)
*G06F 3/12* (2006.01)
*G06K 15/00* (2006.01)
*H04N 1/44* (2006.01)

(52) U.S. Cl.
CPC .......... *H04W 12/02* (2013.01); *G06F 3/1222* (2013.01); *G06F 3/1238* (2013.01); *G06F 3/1288* (2013.01); *G06F 21/608* (2013.01); *G06K 15/4095* (2013.01); *H04L 9/0825* (2013.01); *H04L 63/0407* (2013.01); *H04L 63/0442* (2013.01); *H04N 1/4486* (2013.01); *H04W 12/04* (2013.01); *G06F 2221/2103* (2013.01); *G06F 2221/2109* (2013.01)

(58) Field of Classification Search
CPC ..... H04W 12/02; H04W 12/04; G06F 21/608; G06F 3/1222; G06F 3/1238; H04L 63/0442; H04L 63/123; H04L 9/0825; H04N 1/4486; G06K 15/4095
See application file for complete search history.

(56) References Cited

U.S. PATENT DOCUMENTS

| 8,826,004 | B2 | 9/2014 | Euchner et al. |
| 8,896,858 | B2 | 11/2014 | Zehler |
| 2004/0030887 | A1* | 2/2004 | Harrisville-Wolff ........................ H04L 63/0442 713/155 |
| 2005/0149755 | A1* | 7/2005 | Shima ................... H04L 9/0844 726/4 |
| 2014/0022586 | A1* | 1/2014 | Zehler ................... G06F 21/608 358/1.14 |

\* cited by examiner

*Primary Examiner* — Tri M Tran
(74) *Attorney, Agent, or Firm* — Fox Rothschild LLP

(57) ABSTRACT

A system may include a device having a program that includes a workflow system public key associated with a workflow system and programming instructions that allow the device to communicate with the workflow system over a communication network. The system may initialize a device by sending communications to the workflow system, receiving a response that includes information encrypted with a workflow system private key, and verifying the authenticity of the response by using the workflow system public key to decrypt the information in the response. The system may register the device for privacy treatment by the workflow system by generating a key pair that includes a client private key and a client public key, generating an encrypted client key by encrypting the client public key with the workflow system public key, including the encrypted client key in a privacy request, and sending the privacy request to the workflow system.

27 Claims, 6 Drawing Sheets

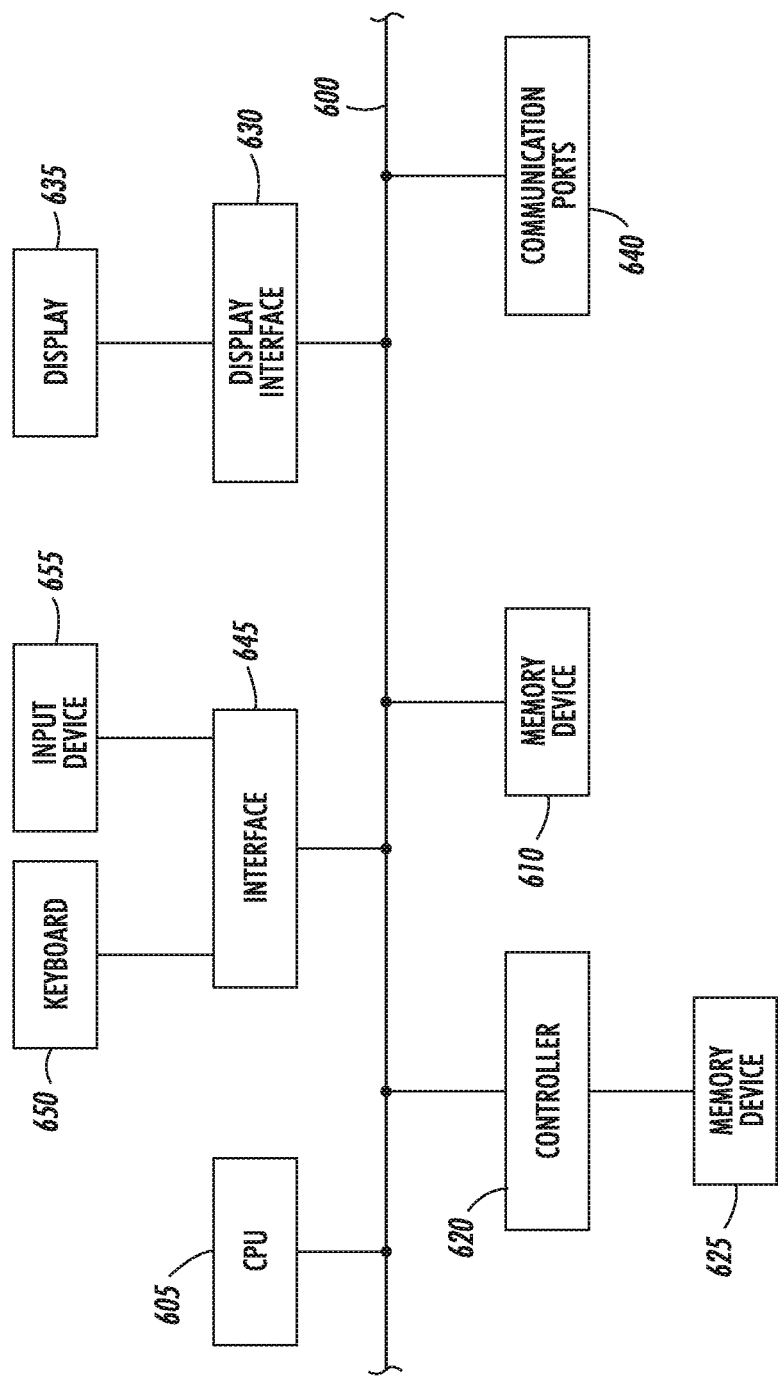

METHODS AND SYSTEMS FOR SECURELY ROUTING DOCUMENTS THROUGH THIRD PARTY INFRASTRUCTURES

BACKGROUND

Many current mobile document systems use third party infrastructure such as cloud storage or email in their submission paths. However, enterprise customers tend to dislike solutions that depend on third party infrastructure due to privacy concerns.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a system for securely transmitting information pertaining to a document to be printed may include a mobile electronic device. The system may initialize the mobile electronic device for communication with a print system by sending one or more communications to the print system, receiving a response from the print system that includes information encrypted with a print system private key, and verifying the authenticity of the response by using the print system public key to decrypt the information in the response. The mobile electronic device includes a mobile client application program having a print system public key and one or more programming instructions that allows the mobile electronic device to communicate with the print system over a communication network. The print system is located remotely from the mobile electronic device and is associated with a document service provider. The system may register the mobile electronic device for privacy treatment by the print system by generating an encrypted client key by encrypting a client public key of the mobile electronic device with the print system public key, including the encrypted client key in a privacy request, and sending the privacy request to the print system. The system may identify a submission stored on the mobile electronic device to securely send to the print system, create a document based on the identified submission, and send the document to the print system via one or more intermediaries to be securely printed. Each intermediary is associated with a different service provider than the document service provider.

In an embodiment, a system for securely transmitting information pertaining to a document to be processed may include a client electronic device having a mobile client application program that includes a workflow system public key associated with a workflow system and one or more first programming instructions that allow the client electronic device to communicate with the workflow system over a communication network. The system may include a computer-readable storage medium having one or more second programming instructions. The system may initialize a client electronic device for communication with a workflow system by sending one or more communications to the workflow system, receiving a response from the workflow system that includes information encrypted with a workflow system private key, and verifying the authenticity of the response by using the workflow system public key to decrypt the information in the response. The workflow system is located remotely from the client electronic device and is associated with a document service provider. The system may register the client electronic device for privacy treatment by the workflow system by generating a key pair that includes a client private key and a client public key, generating an encrypted client key by encrypting the client public key with the workflow system public key, including the encrypted client key in a privacy request, and sending the privacy request to the workflow system.

In an embodiment, the system may identify a submission to securely send to the workflow system, create a document based on the identified submission, and send the document to the workflow system for processing.

Creating a document may involve creating a secure document having three parts. The system may construct a first part of the document by identifying the workflow system public key and an identifier associated with the workflow system, and including the workflow system public key and the identifier in the first part.

In an embodiment, the system may construct a second part of the document by generating, by a clock of the client electronic device, a timestamp associated with the submission, encrypting the timestamp with the client private key, and identifying metadata associated with the submission. The metadata may include a unique identifier associated with the client electronic device that is assigned by the workflow system and included in the received response, and a symmetric key. The system may encrypt the identified metadata with the workflow system public key, and add the encrypted timestamp and the encrypted identified metadata to the second part.

In another embodiment, the system may construct a second part of the document by identifying metadata associated with the submission. The metadata may include a unique identifier associated with the client electronic device that is assigned by the workflow system and included in the received response, and a symmetric key. The system may encrypt the identified metadata with the workflow system public key and add the encrypted identified metadata to the second part.

In an embodiment, the system may construct a third part of the document by identifying content of the submission, encrypting the identified content using the symmetric key, and including the encrypted identified content in the third part.

The system may send the document to the workflow system via one or more intermediaries, where each intermediary is associated with a different service provider than the service provider.

In an embodiment, a system for securely transmitting information pertaining to a document to be processed may include an electronic device and a computer-readable storage medium having one or more programming instructions. The system may receive an initializing request from a client electronic device to initialize communication with the workflow system. The client electronic device may include a mobile client application program that has a workflow system public key and one or more instructions that allows the client electronic device to communicate with the workflow system via a communication network. The workflow system may be located remotely from the client electronic device. The system may send a response to the client electronic device having content that is encrypted with a workflow system private key. The system may receive, from the client electronic device, a privacy request to treat data exchanged between the client electronic device and the workflow system in a secure manner. The privacy request may include an encrypted client key that may be a client public key of the client electronic device that has been encrypted with the workflow system public key. The system may decrypt the encrypted client key using the workflow system private key to obtain the client public key, and store the client public key in a user database so that the client public key is associated with the user.

In an embodiment, the system may receive a document pertaining to a submission from the client electronic device. The system may receive a document from an intermediary. The document may include three parts. A first part may include the workflow system public key and an identifier associated with the workflow system. A second party may include metadata associated with the submission that is encrypted using the workflow system public key, and a symmetric key. A third part may include content of the submission encrypted using the symmetric key.

In an embodiment, the system may validate that the user is an owner of the received document by retrieving from the user database the client public key, attempting to decrypt the encrypted timestamp using the client public key, and determining that the user is the owner of the receive document if the attempt is successful.

The system may use the workflow system private key to decrypt the encrypted metadata, use the client public key to decrypt the encrypted content of the submission, and process the submission using the metadata and the content. The system may process the submission by performing one or more of the following print-related functions on the submission: printing; scanning; binding; collating; or punching.

BRIEF DESCRIPTION OF THE DRAWINGS

FIG. 6 illustrates a block diagram of example hardware that may be used to contain or implement program instructions according to an embodiment.

DETAILED DESCRIPTION

The following terms shall have, for purposes of this application, the respective meanings set forth below:

A "computing device" or "electronic device" refers to a device that includes a processor and tangible, computer-readable memory. The memory may contain programming instructions that, when executed by the processor, cause the electronic device to perform one or more operations according to the programming instructions. Examples of electronic devices include personal computers, servers, mainframes, gaming systems, televisions, and portable electronic devices such as smartphones, personal digital assistants, cameras, tablet computers, laptop computers, media players and the like.

A "document" refers to a digital representation of a document such as a word processor file, a PDF file, or a bitmap file (e.g. TIFF, JPG, PNG files etc.) that is stored in a computer readable memory or a storage medium. A document file may be an electronic representation of a physical document that contains one or multiple pages. A document may also refer to the set of instructions or metadata that cause the document to be processed.

A "document service" refers to a service that can modify or otherwise process a document, for example, by performing print-related services, document repository services, scanning services, document management services, image processing services and/or the like.

A "production device" device refers to a device used to process at least a portion of a document. Examples of production devices may include, without limitation, printers, inserters, binders, punchers, collators, multi-function devices or other similar equipment and/or the like.

A "private key" refers to an asymmetric cryptographic key that is used to encrypt or decrypt messages. Messages encrypted using a private key may be decrypted by a recipient who possesses an associated public key. Likewise, messages that are encrypted using an associated public key may be decrypted using a private key.

A "public key" refers to an asymmetric cryptographic key that can be obtained and used by anyone to encrypt and/or decrypt messages. Messages encrypted using a public key may be decrypted by a recipient who possesses an associated private key. Likewise, messages that are encrypted using a private key may be decrypted by a recipient who possesses an associated public key.

A "workflow system" refers to a document management or processing system associated with a document service provider.

Figure 1:
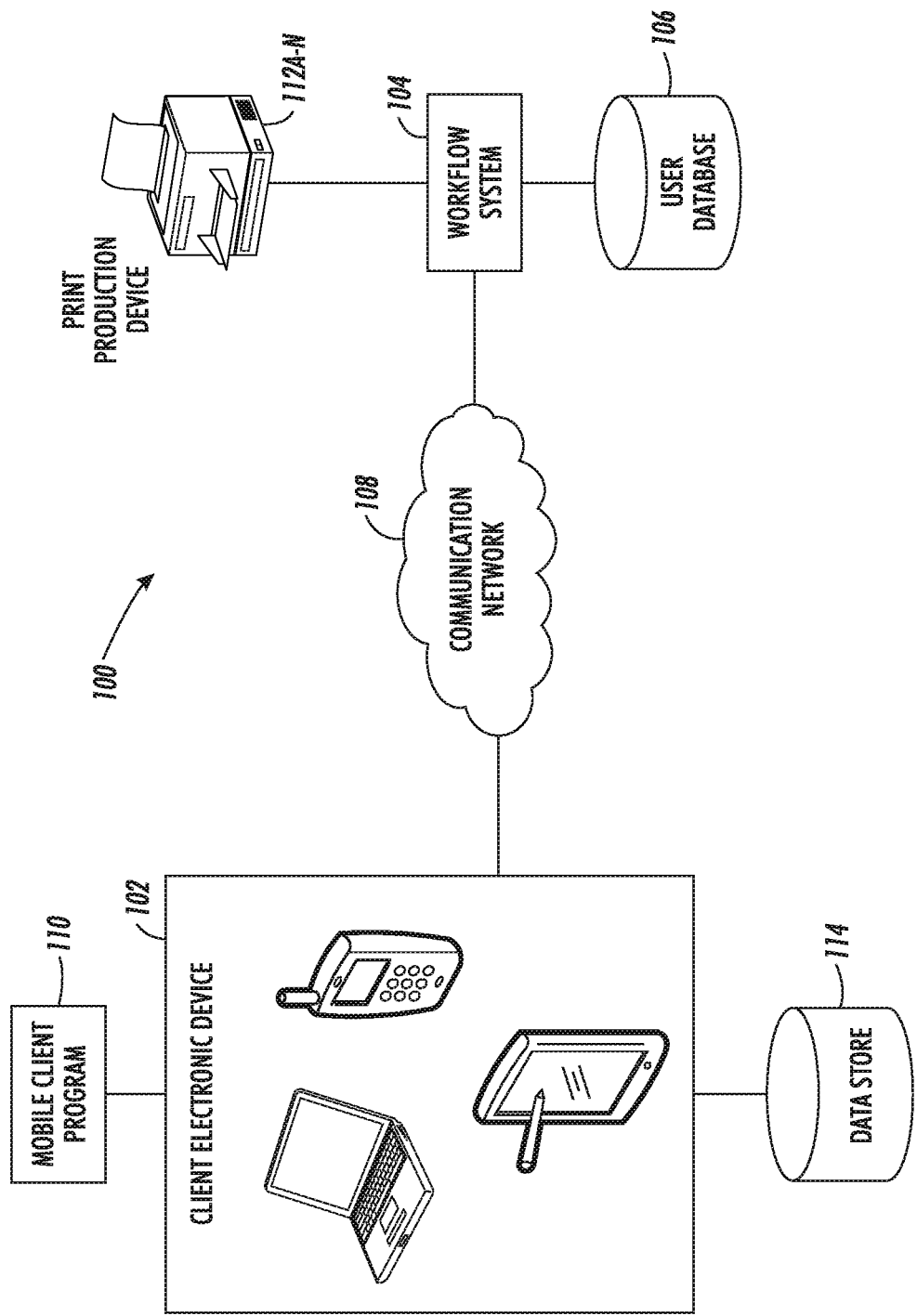
FIG. 1 illustrates an example system for securely routing documents according to an embodiment.

FIG. 1 illustrates an example system for securely routing documents according to an embodiment. As shown in FIG. 1, the system 100 includes a client electronic device 102, a workflow system 104, and a user database 106. The client electronic device 102 may be in communication with the workflow system 104 via a communication network 108. A communication network 108 may be a local area network (LAN), a wide area network (WAN), a mobile or cellular communication network, an extranet, an intranet, the Internet and/or the like.

In an embodiment, a workflow system 104 may be a system associated with a document service provider. A workflow system may be a system that allows a user or administrator to secure, track, monitor, and/or process documents that are accessed by, modified by, and/or provided by permitted client systems. For example, an employer may utilize a workflow system to manage its documents, document workflows and/or the like. Employees may access documents from the workflow system on their mobile device from outside of the office.

A workflow system may be hosted by a customer of the document service provider. A workflow system 104 may be implemented on a single computing device or across a plurality of computing devices. In various embodiments, a workflow system may include one or more print production devices 112a-N such as printers, scanners, multifunction devices, binders, collators, punchers and/or the like. As shown in FIG. 1, a workflow system 104 may include or be in communication with a user database 106. In certain embodiments, a workflow system 104 may be provided or installed along with a trusted certificate that includes a private key and a public key. As such, a workflow system 104 may be associated with its own public key and private key.

In an embodiment, a client electronic device 102 may be a mobile electronic device such as, for example, a smartphone, a tablet, and/or the like. A user of a client electronic device 102 may be an employee or agent, or otherwise affiliated with the customer associated with the workflow system 104. A client electronic device 102 may include a mobile client program 110, that includes one or more programming instructions that allows the client electronic device to interface and communicate with the workflow system 104. In certain embodiments, a client electronic device 102 may store the workflow system's public key. For example, when a client electronic device 102 downloads or otherwise installs a mobile client program, the client electronic device may be provided with the workflow system's public key. In certain embodiments, a client electronic device 102 may store the workflow system's public key and/or other data in a data store 114.

In various embodiments, a user of a client electronic device may want to send information, such as documents, to a workflow system in a secure manner via one or more third party intermediaries. A third party intermediary may be third party infrastructure such as, for example, a cloud storage service provider, a third party email provider and/or the like. In various embodiments, a third party intermediary may not be associated with the service provider of the workflow system. For example, a user of a client electronic device may wish to print a document to a printer associated with the workflow system via a cloud-based print service not offer by or through the service provider of the workflow system. However, using the protection techniques as described in this disclosure, a client electronic device may securely send information to a workflow system, even when routed through one or more third party intermediaries.

In various embodiments, the process of securely transmitting information from a client electronic device to a workflow system via one or more third party intermediaries may involve the client electronic device registering with the workflow system. Once the client electronic device registers with the workflow system, the client electronic device may be able to securely communicate with the workflow system via one or more third party intermediaries.

Figure 2:
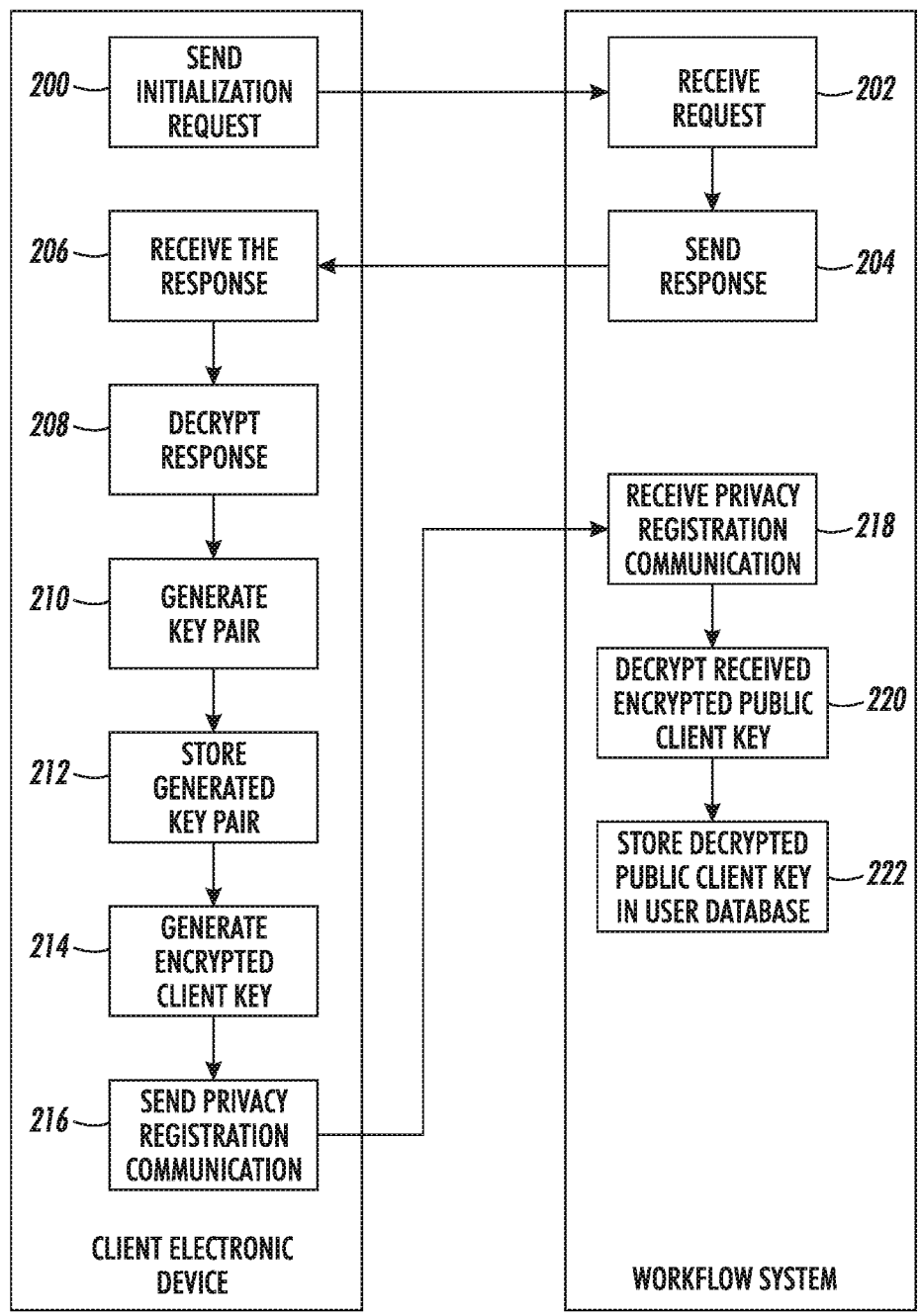
FIG. 2 illustrates an example method of registering a client electronic device with a workflow system according to an embodiment.

FIG. 2 illustrates an example method of initializing a client electronic device and registering for privacy treatment with a workflow system according to an embodiment. As illustrated by FIG. 2, a client electronic device may send 200 an initialization request to a workflow system. In an embodiment, a client electronic device may send 200 an initialization request through a sequence of secure web calls. For example, a client electronic device may send 200 one or more communications to the workflow system that includes one or more credentials, metadata and/or the like. For example, a client electronic device may send 200 a username and a password associated with a user to the workflow system.

In an embodiment, the workflow system may receive 202 the request, and may send 204 a response to the client electronic device. The response may include a unique identifier associated with the client electronic device. The information included in the response may be encrypted by the workflow system with the workflow system's private key. As such, the response includes information that can only be decrypted using the workflow system's public key. This provides the client electronic device with an assurance that the workflow system is a legitimate service and not one trying to inappropriately access the client electronic device's information.

In an embodiment, the client electronic device may receive 206 the response, and may decrypt 208 the information included in the response to verify the authenticity of the sender. In an embodiment, the client electronic device may use the public key of the workflow system to decrypt 208 information included in the response. For instance, the client electronic device may retrieve the workflow system's public key from memory and use it to decrypt 208 information included in the response. In other embodiments, a client electronic device may receive a public key associated with the workflow system via email from, for example, a provider, from a secure website, and/or the like.

As illustrated by FIG. 2, the client electronic device may generate 210 its own public and private keys. A client electronic device may include a key generator, such as, for example, a random key generator, which may generate 210 a public/private key pair for the client electronic device. In various embodiments, the client electronic device may store 212 the generated key pair in a secure data store associated with the client electronic device.

In various embodiments, a client electronic device may submit a privacy request to the workflow system. The privacy request may be a request for privacy treatment of submissions from the client electronic device by the workflow system. For instance, a privacy request may request that data sent from the client electronic device to the workflow system be processed in a manner that keeps it secure during transit, storage and/or the like. The client electronic device may generate 214 an encrypted client key by encrypting its public key with the public key of the workflow system. As such, when the client electronic device sends its public key to the workflow system, it is encrypted using the workflow system's public key. This may prevent an attack while the public key is in transit.

A client electronic device may encrypt its key with the public key of the workflow system using any appropriate and mutually agreed upon encryption algorithm or technique. The client electronic device may send 216 a privacy registration communication that includes the encrypted client key to the workflow system. As such, the workflow system may know the public key of the client electronic device, and the public key may be associated with an authenticated user of the client electronic device.

The workflow system may receive 218 the privacy request. The workflow system may use its private key to decrypt 220 the received encrypted public client key. The workflow system may store 222 the decrypted public client key in an entry of a user database such that it is associated with the user of the client electronic device. For instance, the workflow system may store 222 the decrypted public client key in a secure manner in an entry of a relational database and/or secure key store so that it is associated with an identifier associated with the user.

In an embodiment, once a user of a client electronic device registers with a workflow system for privacy treatment, documents communicated between the client electronic device and the workflow system may be processed in a manner to secure the communication.

Figure 3:
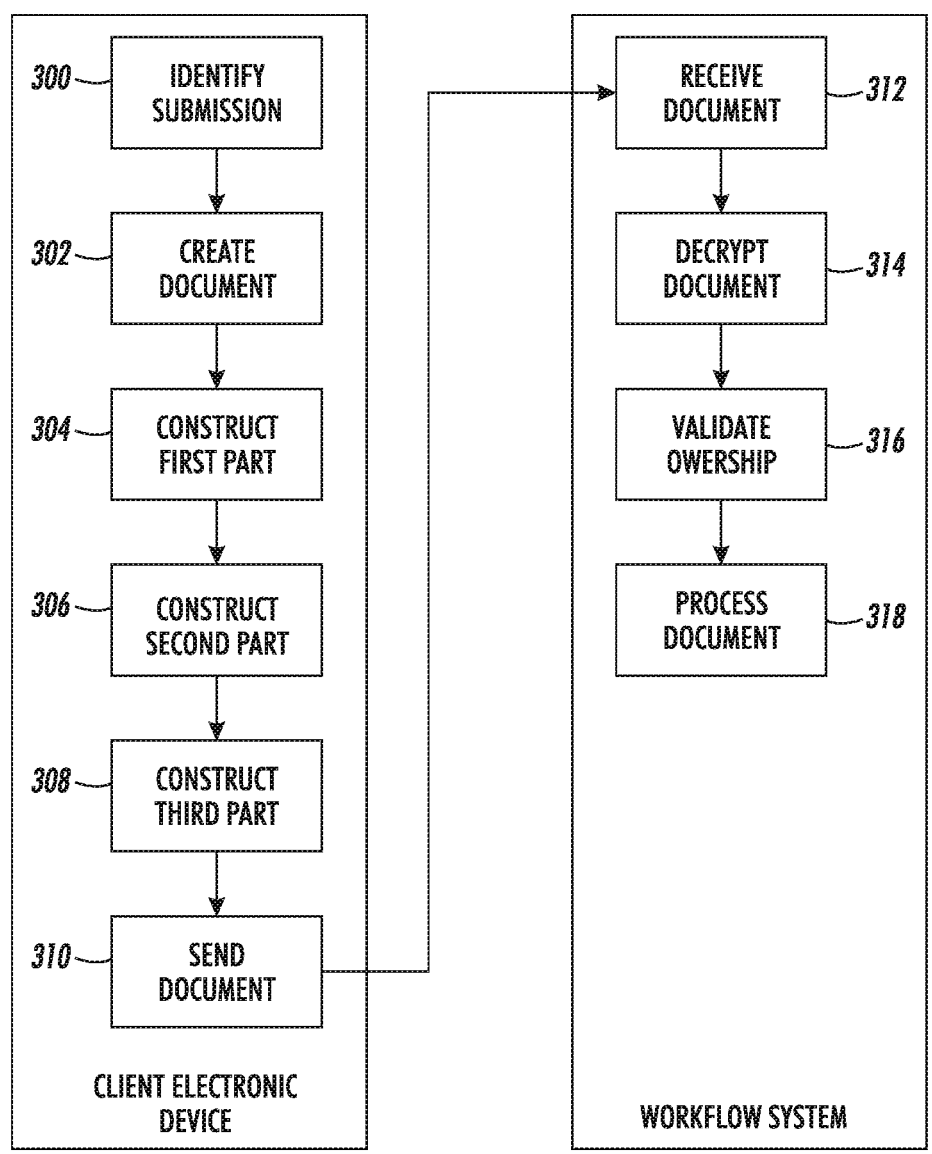
FIG. 3 illustrates an example method of processing a submission from a client electronic device to a workflow system according to an embodiment.

FIG. 3 illustrates an example method of processing a submission from a client electronic device that has registered with a workflow system according to an embodiment. As illustrated by FIG. 3, a client electronic device may identify 300 a submission to be made to the workflow system. The submission may include a document, an email, or other information. A client electronic device may identify 300 a submission to be made by receiving a selection from a user of the client electronic device.

Figure 4:
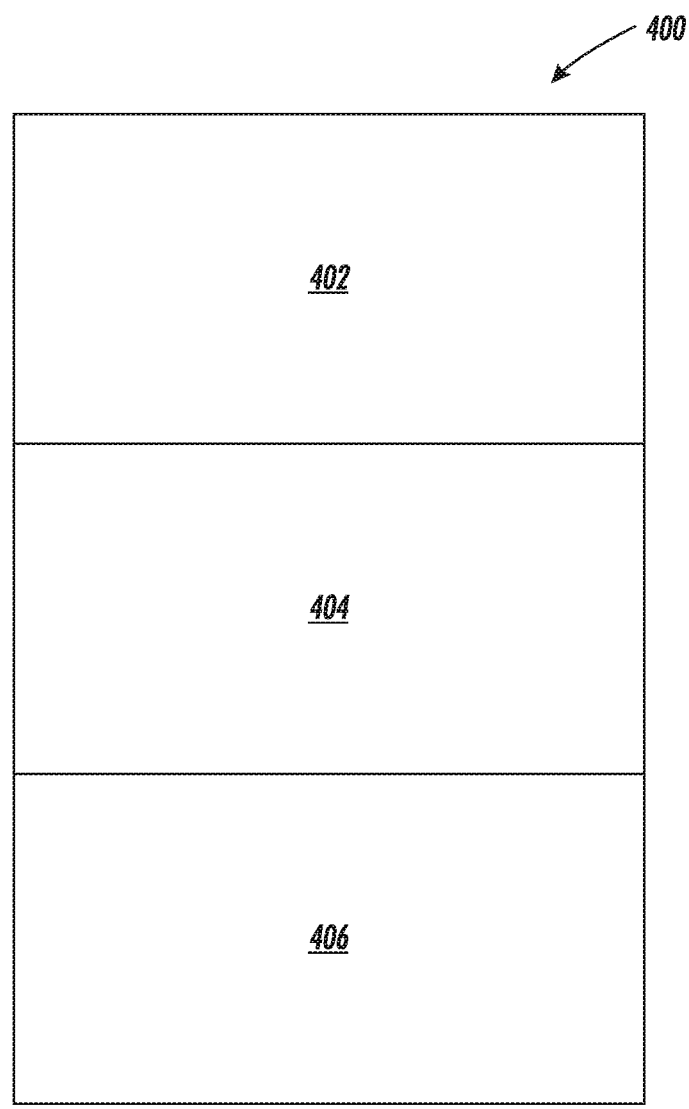
FIG. 4 illustrates an example document according to an embodiment.

The client electronic device may create 302 a private and secure document based on the identified submission. In certain embodiments, the document may include three separate parts. FIG. 4 illustrates an example document 400 having three parts according to an embodiment. As illustrated by FIG. 4, a document may have a first part 402, a second part 404 and a third part 406.

Referring back to FIG. 3, the client electronic device may construct 304 a first part of the document by including public information pertaining to the submission. This public information may include the public key of the workflow system and a destination address. In an embodiment, a destination address may include an identifier associated with the workflow system.

In an embodiment, the client electronic device may construct 306 a second part of the document by generating private information pertaining to the submission. A client electronic device may generate a timestamp for the submission. The timestamp may correspond to a time at which the submission is being made. The client electronic device may encrypt the timestamp using the private key associated with the client electronic device in order to validate that the submission is from the user, and include the encrypted timestamp in the second part of the document. The client electronic device may include its unique client identifier in the second part of the document. The unique client identifier may be the identifier assigned to the client electronic device by the workflow system and provided to the client electronic device by the workflow system as part of the response sent in step 204 of FIG. 2 above.

In an alternate embodiment, a client electronic device may generate a hash of the first part of the document, and encrypt the hash. This may provide additional protection and a mechanism by which any tampering to the first portion will be evident.

In an embodiment, a client electronic device may encrypt metadata associated with a submission and include the encrypted information in the second part of the document. Metadata of a submission may be information needed to process the submission, including, without limitation, job ticket information, submission name, submission type, ownership details, financial information, version number, time of creation, place of creation and/or the like. In various embodiments, the client electronic device may encrypt the submission metadata with the workflow system's public key. As such, only the intended target may decode the metadata and associated third part of the document.

In various embodiments, the second part of the document may include a symmetric key. A client electronic device may generate a symmetric key, which may be included in the second part. In an embodiment, the symmetric key may be included in the metadata that is encrypted. A symmetric key may be a random number, a globally unique identifier (GUID) obtained from one or more system calls, a password and/or the like. A symmetric key may be used to encode and/or decode data using a mutually agreed upon encryption algorithm such as, for example, Advanced Encryption Standard, triple-Data Encryption Standard and/or the like.

In an embodiment, the client electronic device may construct 308 a third part of the document that includes the content of the submission. For instance, the client electronic device may encrypt the content of the submission using the symmetric key passed in the encrypted second part of the document.

Although a three-part document is discussed as an example of a secure document, it is understood that alternative document formats or structures may be used within the scope of this disclosure.

Figure 5:
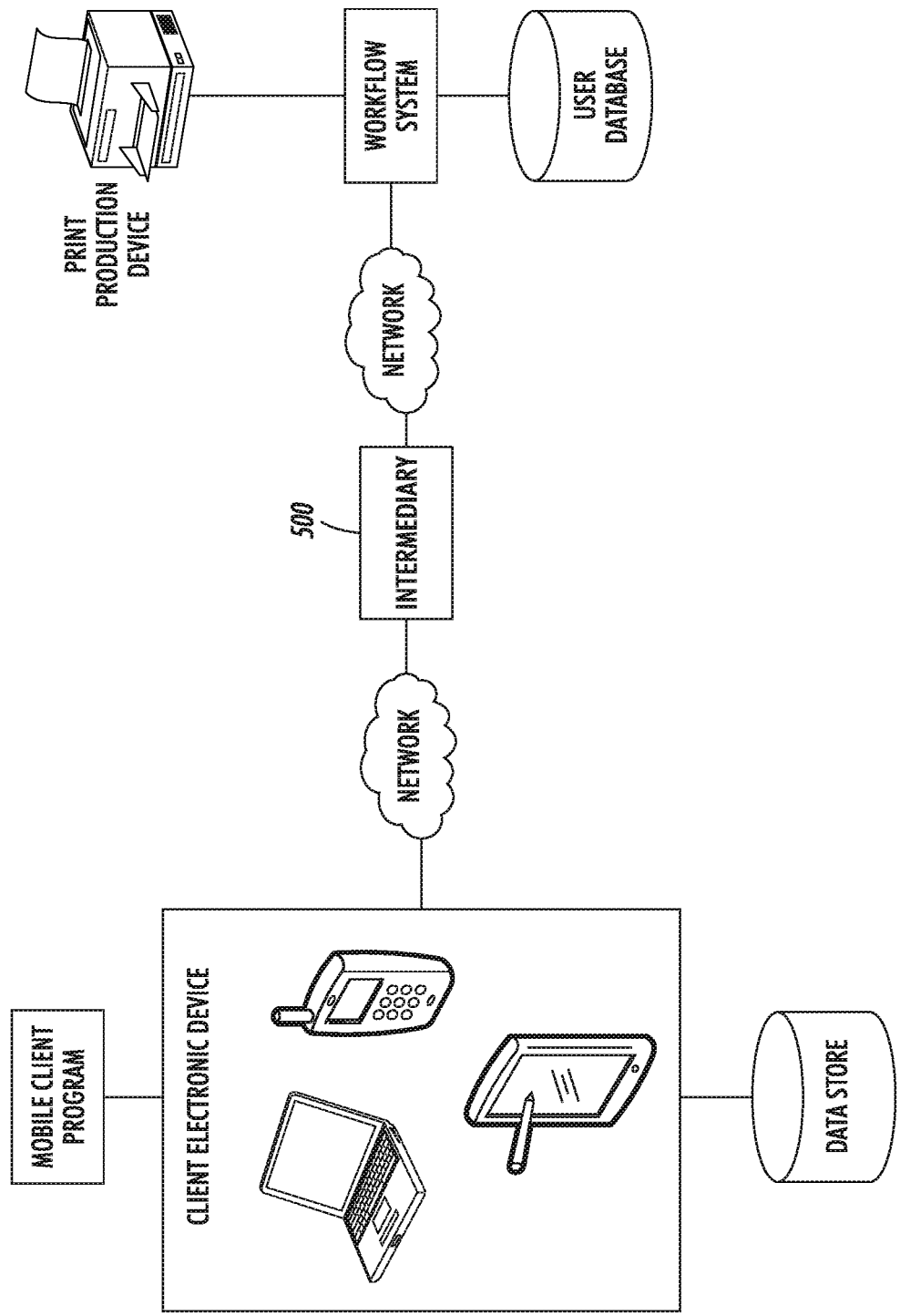
FIG. 5 illustrates an example system for securing mobile document workflows according to an embodiment.

Referring back to FIG. 3, a client electronic device may send 310 the document to the workflow system. In various embodiments, the client electronic device may send 310 the document directly to the workflow system. In other embodiments, the client electronic device may route the document to the workflow system via one or more intermediaries, as illustrated by FIG. 5.

The workflow system may receive 312 the document (either from the client electronic device or an intermediary), and may decrypt 314 the appropriate portions. The workflow system may decrypt 314 the encrypted metadata using the workflow system's private key. The workflow system may decrypt 314 the content of the submission using the symmetric key from the document's metadata (second portion). The workflow system may retrieve the public key of the client electronic device from the user database and secure key store. For instance, the workflow system may use the unique identifier associated with the client electronic device obtained from the metadata to locate the appropriate public key for the client electronic device from the user database and secure key store.

In an embodiment, the workflow system may validate 316 ownership of the received document. The workflow system may validate 316 ownership of the received document by decrypting the encrypted timestamp of the second part of the document. The workflow system may retrieve the user's public key from the user database and may use the retrieved public key to decrypt the encrypted timestamp. If the decryption succeeds, the workflow system may confirm ownership of the document by the client electronic device. If the decryption does not succeed, the workflow system may determine that the received document did not originate with the client electronic device.

If the workflow system confirms that the client electronic device is the source of the document, the workflow system may process 318 the document. The workflow system may use the decrypted metadata and content of the document to perform one or more document processing services to the document. Example document processing services may include, for instance, printing, scanning, collating, binding, punching, laminating, storing, performing optical character recognition, indexing, summarizing, translating, redacting, and/or directing the document to a specified individual or process. Other example document processing services may include embedding security glyphs, reformatting the document for specific uses or recipients, performing form data extraction and/or the like.

FIG. 6 depicts an example of internal hardware that may be included in any of the electronic components of the system, such as the user electronic device, or the remote server. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 610. A memory device may include a single device or a collection of devices across which data and/or instructions are stored.

An optional display interface 630 may permit information from the bus 600 to be displayed on a display device 645 in visual, graphic or alphanumeric format. An audio interface and audio output (such as a speaker) also may be provided. Communication with external devices may occur using various communication devices 640 such as a transmitter and/or receiver, antenna, an RFID tag and/or short-range or near-field communication circuitry. A communication device 640 may be attached to a communications network, such as the Internet, a local area network or a cellular telephone data network.

The hardware may also include a user interface sensor 645 that allows for receipt of data from input devices 650 such as a keyboard, a mouse, a joystick, a touchscreen (which may be part of the display), a remote control, a pointing device, a video input device and/or an audio input device. Data also may be received from an imaging capturing device 620 such as a scanner or camera.

In some embodiments, the system may use additional hardware components, such as a biometric device, a clock circuit and or a positioning system (such as a Global Positioning System sensor).

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of securely transmitting information pertaining to a document to be printed, the method comprising, by a mobile electronic device:
    initializing a mobile electronic device for communication with a print workflow system by:
        sending one or more communications to the print workflow system, wherein the mobile electronic device comprises a mobile client application program that comprises a print workflow system public key and one or more programming instructions that allow the mobile electronic device to communicate with the print workflow system over a communication network, wherein the print workflow system is located remotely from the mobile electronic device and is associated with a document service provider,
        receiving a response from the print workflow system that includes information encrypted with a print workflow system private key, wherein the information comprises a unique identifier associated with the mobile electronic device that has been assigned by the print workflow system, and
        verifying the authenticity of the response by using the print workflow system public key to decrypt the information in the response;
    registering the mobile electronic device for privacy treatment by the print workflow system by:
        generating an encrypted client key by encrypting a client public key of the mobile electronic device with the print workflow system public key, and
        generating a privacy request comprising:
            a request from the mobile electronic device that the print workflow system process all submissions from the mobile electronic device in a secure manner, and the encrypted client key, and
            sending the privacy request to the print workflow system;
    identifying a submission stored on the mobile electronic device to securely send to the print workflow system;
    creating a document based on the identified submission, wherein the document comprises three parts, wherein at least one part of the document comprises the unique identifier associated with the mobile electronic device encrypted with the print workflow system public key; and
    sending the document to the print workflow system via one or more intermediaries to be securely printed, wherein each intermediary is associated with a different service provider than the document service provider.

2. A method of securely transmitting information pertaining to a document to be processed, the method comprising, by a client electronic device:
    initializing a client electronic device for communication with a workflow system by:
        sending one or more communications to the workflow system, wherein the client electronic device comprises a mobile client application program that comprises a workflow system public key and one or more programming instructions that allow the client electronic device to communicate with the workflow system over a communication network, wherein the workflow system is located remotely from the client electronic device and is associated with a document service provider;
        receiving a response from the workflow system that includes information encrypted with a workflow system private key, and
    verifying the authenticity of the response by using the workflow system public key to decrypt the information in the response; and
    registering the client electronic device for privacy treatment by the workflow system by:
        generating a key pair that includes a client private key and a client public key,
        generating an encrypted client key by encrypting the client public key with the workflow system public key,
    generating a privacy request comprising:
        a request from the mobile electronic device that the print system process all submissions from the mobile electronic device in a secure manner, and the encrypted client key,
        sending the privacy request to the workflow system;
    identifying a submission to securely send to the workflow system;
    creating a document based on the identified submission, wherein the document comprises three parts, wherein at least one part of the document comprises the unique identifier associated with the mobile electronic device encrypted with the workflow system public key.

3. The method of claim 2, further comprising:
    identifying a submission to securely send to the workflow system;
    creating a document based on the identified submission; and
    sending the document to the workflow system for processing.

4. The method of claim 2, wherein creating a document based on the identified submission comprises creating a secure document comprising three parts.

5. The method of claim 2, further comprising:
constructing a first part of the document by identifying the workflow system public key and an identifier associated with the workflow system, and including the workflow system public key and the identifier in the first part.

6. The method of claim 2, further comprising constructing a second part of the document by:
generating, by a clock of the client electronic device, a timestamp associated with the submission;
encrypting the timestamp with the client private key;
identifying metadata associated with the submission, wherein the metadata includes:
a unique identifier associated with the client electronic device, wherein the unique identifier is assigned by the workflow system and included in the received response, and
a symmetric key;
encrypting the identified metadata with the workflow system public key; and adding the encrypted timestamp and the encrypted identified metadata to the second part.

7. The method of claim 2, further comprising constructing a second part of the document by:
identifying metadata associated with the submission, wherein the metadata includes:
a unique identifier associated with the client electronic device, wherein the unique identifier is assigned by the workflow system and included in the received response, and a symmetric key;
encrypting the identified metadata with the workflow system public key and adding the encrypted identified metadata to the second part.

8. The method of claim 7, further comprising constructing a third part of the document by:
identifying content of the submission;
encrypting the identified content using the symmetric key; and
including the encrypted identified content in the third part.

9. The method of claim 3, wherein sending the document to the workflow system comprises sending the document to the workflow system via one or more intermediaries, wherein each intermediary is associated with a different service provider than the service provider.

10. A method of securely transmitting information pertaining to a document to be processed, the method comprising, by a workflow system:
receiving an initializing request from a client electronic device to initialize communication with the workflow system, wherein the client electronic device comprises a mobile client application program that comprises a workflow system public key and one or more instructions that allows the client electronic device to communicate with the workflow system via a communication network, wherein the workflow system is located remotely from the client electronic device;
generating a unique identifier associated with the client electronic device; sending a response to the client electronic device comprising content that is encrypted with a workflow system private key, wherein the content comprises the unique identifier;
receiving, from the client electronic device, a privacy request to treat data exchanged between the client electronic device and the workflow system in a secure manner, wherein the privacy request comprises an encrypted client key, wherein the encrypted client key comprises a client public key of the client electronic device that has been encrypted with the workflow system public key;
decrypting the encrypted client key using the workflow system private key to obtain the client public key; and
storing the client public key in a user database so that the client public key is associated with the user; and
receiving a document pertaining to a submission from the client electronic device, wherein the document comprises three parts, wherein at least one part of the document comprises the unique identifier associated with the mobile electronic device encrypted with the workflow system public key.

11. The method of claim 10 wherein, further comprising:
receiving a document pertaining to a submission from the client electronic device, wherein the document comprises three parts,
wherein a first part comprises the workflow system public key and an identifier associated with the workflow system,
wherein a second part comprises:
metadata associated with the submission that is encrypted using the workflow system public key, wherein the metadata comprises the unique identifiers, and
a symmetric key,
wherein a third part comprises content of the submission encrypted using the symmetric key.

12. The method of claim 11, wherein receiving a document pertaining to a submission from the client electronic device comprises receiving a document from an intermediary.

13. The method of claim 11, further comprising validating that the user is an owner of the received document by:
retrieving from the user database the client public key;
attempting to decrypt the encrypted timestamp using the client public key; and
determining that the user is the owner of the receive document if the attempt is successful.

14. The method of claim 13, further comprising:
using the workflow system private key to decrypt the encrypted metadata;
using the client public key to decrypt the encrypted content of the submission; and
processing the submission using the metadata and the content.

15. The method of claim 14, wherein processing the submission comprises performing one or more of the following print-related functions on the submission:
printing;
scanning;
binding;
collating; or
punching.

16. A system for securely transmitting information pertaining to a document to be processed, the system comprising:
a client electronic device having a mobile client application program that comprises a workflow system public key associated with a workflow system and one or more first programming instructions that allow the client electronic device to communicate with the workflow system over a communication network; and
a computer-readable storage medium comprising one or more second programming instructions that, when executed, cause the client electronic device to:

initialize for communication with a workflow system by: sending one or more communications to the workflow system, wherein the workflow system is located remotely from the client electronic device and is associated with a document service provider, receiving a response from the workflow system that includes information encrypted with a workflow system private key, and verifying the authenticity of the response by using the workflow system public key to decrypt the information in the response, and register the client electronic device for privacy treatment by the workflow system by:

generating a key pair that includes a client private key and a client public key, generating an encrypted client key by encrypting the client public key with the workflow system public key, generating a privacy request comprising:

a request from the mobile electronic device that the print system process all submissions from the mobile electronic device in a secure manner, and the encrypted client key, and sending the privacy request to the workflow system;

identifying a submission to securely send to the workflow system; and creating a document based on the identified submission, wherein the document comprises three parts, wherein at least one part of the document comprises the unique identifier associated with the mobile electronic device encrypted with the workflow system public key.

17. The system of claim 16, wherein the second programming instructions further comprise one or more programming instructions that, when executed, cause the client electronic device to:

identify a submission to securely send to the workflow system;

create a document based on the identified submission; and send the document to the workflow system for processing.

18. The system of claim 17, wherein the one or more second programming instructions that, when executed, cause the client electronic device to create a document comprise one or more programming instructions that, when executed, cause the client electronic device to construct a first part of the document by identifying the workflow system public key and an identifier associated with the workflow system, and include the workflow system public key and the identifier in the first part.

19. The system of claim 17, wherein the one or more second programming instructions that, when executed, cause the client electronic device to create a document comprise one or more programming instructions that, when executed, cause the client electronic device to construct a second part of the document by:

generating, by a clock of the client electronic device, a timestamp associated with the submission;

encrypting the timestamp with the client private key;

identifying metadata associated with the submission, wherein the metadata includes:

a unique identifier associated with the client electronic device, wherein the unique identifier is assigned by the workflow system and included in the received response, and a symmetric key;

encrypting the identified metadata with the workflow system public key; and adding the encrypted timestamp and the encrypted identified metadata to the second part.

20. The system of claim 17, wherein the one or more second programming instructions that, when executed, cause the client electronic device to create a document comprise one or more programming instructions that, when executed, cause the client electronic device to construct a second part of the document by:

identifying metadata associated with the submission, wherein the metadata includes:

a unique identifier associated with the client electronic device, wherein the unique identifier is assigned by the workflow system and included in the received response, and a symmetric key;

encrypting the identified metadata with the workflow system public key and adding the encrypted identified metadata to the second part.

21. The system of claim 20, wherein the one or more second programming instructions that, when executed, cause the client electronic device to create a document comprise one or more programming instructions that, when executed, cause the client electronic device to construct a third part of the document by:

identifying content of the submission;

encrypting the identified content using the symmetric key; and including the encrypted identified content in the third part.

22. The system of claim 17, wherein the one or more second programming instructions that, when executed, cause the client electronic device to send the document to the workflow system comprise one or more programming instructions that, when executed, cause the client electronic device to send the document to the workflow system via one or more intermediaries, wherein each intermediary is associated with a different service provider than the service provider.

23. A system for securely transmitting information pertaining to a document to be processed, the system comprising:

an electronic device associated with a workflow system;

a computer-readable storage medium comprising one or more programming instructions that, when executed, cause the electronic device to:

receive an initializing request from a client electronic device to initialize communication with the workflow system, wherein the client electronic device comprises a mobile client application program that comprises a workflow system public key and one or more instructions that allows the client electronic device to communicate with the workflow system via a communication network, wherein the workflow system is located remotely from the client electronic device, generate a unique identifier associated with the client electronic device, send a response to the client electronic device comprising content that is encrypted with a workflow system private key, wherein the content comprises the unique identifier, receive, from the client electronic device, a privacy request to treat data exchanged between the client electronic device and the workflow system in a secure manner, wherein the privacy request comprises an encrypted client key, wherein the encrypted client key comprises a client public key of the client electronic device that has been encrypted with the workflow system public key, decrypt the encrypted client key using the workflow system private key to obtain the client public key, and store the client public key in a user database so that the client public key is associated with the user, and receive a document pertaining to a submission from the client electronic device, wherein the document comprises three parts, wherein at least one part of the document comprises the unique identifier associated with the mobile electronic device encrypted with the workflow system public key.

24. The system of claim 23, wherein the computer-readable storage medium further comprises one or more programming instructions that, when executed, cause the electronic device to:

receive a document pertaining to a submission from the client electronic device, wherein the document comprises three parts, wherein a first part comprises the workflow system public key and an identifier associated with the workflow system, wherein a second part comprises:

metadata associated with the submission that is encrypted using the workflow system public key, and a symmetric key, wherein a third part comprises content of the submission encrypted using the symmetric key.

25. The system of claim 24, wherein the one or more programming instructions that, when executed, cause the electronic device to receive a document comprise one or more programming instructions that, when executed, cause the electronic device to receive a document from an intermediary.

26. The system of claim 24, wherein the computer-readable storage medium further comprises one or more programming instructions that, when executed, cause the electronic device to validate that the user is an owner of the received document by:

retrieving from the user database the client public key;

attempting to decrypt the encrypted timestamp using the client public key; and determining that the user is the owner of the receive document if the attempt is successful.

27. The system of claim 26, wherein the computer-readable storage medium further comprises one or more programming instructions that, when executed, cause the electronic device to:

use the workflow system private key to decrypt the encrypted metadata;

use the client public key to decrypt the encrypted content of the submission; and process the submission using the metadata and the content by instructing one or more print-related devices to perform one or more of the following print-related functions on the submission:

printing;

scanning;

binding;

collating; or punching.

* * * * *